United States Patent [19]

Bowling

[11] 4,348,061
[45] Sep. 7, 1982

[54] WHEEL COVER RETENTION

[75] Inventor: James T. Bowling, Grosse Pointe Farms, Mich.

[73] Assignee: J. Connell Associates, Bloomfield Hills, Mich.

[21] Appl. No.: 147,420

[22] Filed: May 6, 1980

[51] Int. Cl.³ .............................................. B60B 7/00
[52] U.S. Cl. ................................. 301/37 R; 301/37 P; 24/295
[58] Field of Search ................. 301/37 R, 37 P, 37 C, 301/37 B, 108 R, 108 A; 24/73 HC, 295, 259 R

[56] References Cited

U.S. PATENT DOCUMENTS

| | | | |
|---|---|---|---|
| 2,757,978 | 8/1956 | Lyon | 301/37 R |
| 2,841,445 | 7/1958 | Lyon | 301/37 B |
| 3,970,346 | 7/1976 | Kretschmer | 301/37 P |
| 4,093,312 | 6/1978 | Kretschmer | 301/37 P |
| 4,231,619 | 11/1980 | Beisch et al. | 301/37 P |
| 4,247,151 | 1/1981 | Brown et al. | 301/37 P |

Primary Examiner—H. Grant Skaggs
Attorney, Agent, or Firm—Jay C. Taylor

[57] ABSTRACT

A wheel cover is attached to a vehicle wheel by a plurality of spring steel clips secured to the cover at circumferentially spaced locations. Each clip is provided with a resilient arm cooperable with portions of the wheel cover to prevent excessive bending of the clip during attachment and removal of the cover from the wheel and also to assure substantially coaxial alignment of the cover and wheel in predetermined axially spaced relationship when the cover and wheel are attached.

6 Claims, 3 Drawing Figures

WHEEL COVER RETENTION

BACKGROUND AND OBJECTS OF THE INVENTION

This invention relates to wheel covers, which term herein includes trim rings and the like adapted to be removably attached to a vehicle wheel, and in particular relates to means for securing such covers to an axial flange of the wheel.

Heretofore great effort has been expended in the development of wheel covers and retention means for positively securing the covers to the wheels so as to withstand various tests and road conditions tending to jar the covers loose. In consequence, considerable difficulty is often experienced when it is desired to remove the cover, as for example to replace or repair a dented or otherwise damaged cover or to change a tire. The retention means may be so effective that the cover cannot be removed without serious injury to the parts, with the result that after one or two removals, the retention means and sometimes the cover are damaged beyond use.

When a wheel cover is properly located coaxially on a wheel, the force required to secure the cover to the wheel is appreciably less than when the cover is secured eccentrically. Also, when a cover is inadvertently secured eccentrically to the wheel, not only do the resulting unbalanced centrifugal forces tend to throw the cover from the wheel but tire wear is accelerated and the vehicle ride can be objectionable.

In order to secure the cover coaxially to the wheel, it has been the practice heretofore to secure the cover at a number of circumferentially spaced locations, as for example, six or eight. Thus, if a careless mechanic fails to force one of the conventional retention devices properly against the wheel, the circumferentially adjacent retention devices assure a reasonably coaxial attachment between the cover and wheel.

A significant contribution of the present invention has resulted from the realization that the numerous retention devices required heretofore are merely to assure reasonable coaxial attachment between the cover and the wheel, whereas if care is taken to attach the cover coaxially, a nominal number of conventional retention devices, as for example, one-half the number employed heretofore, will secure the cover positively to the wheel under all typical driving conditions.

It is an important object of the present invention to provide improved retention means for a vehicle wheel cover whereby alternate retainers may comprise a set of locating devices which are only nominally effective by themselves as retention devices and which are therefore easily removable from the wheel, but which are effective in assuring that the cover is located and secured coaxially on the wheel. In consequence of reducing the number of effective retention devices, the cover may be pried from the wheel with far less effort than has been required heretofore, because only nominal force is required to pry the remaining locating devices from the wheel.

In order to remove a wheel cover from a vehicle wheel, it is customary to insert a heavy screwdriver or other pry between the cover and wheel at one circumferential location and pry the cover loose. Usually the free space between the prying tool and the vehicle wheel or tire is quite limited, with the frequent result that when the tool swings into engagement with the tire at the limit of the available prying movement, the retention device merely yields resiliently without in any way being dislodged from its attachment with the wheel rim. When the prying tool is removed, the retention device returns resiliently to its former attached position. On the other hand, if the prying operation is successful, the diametrically opposite retention device is often deformed beyond its elastic limit, with consequent damage to the overly stressed retention device and impairment of its attachment effectiveness for successive use.

Other important objects are to provide an improved wheel cover that is effective to limit the extent of eccentricity between the cover and wheel, and to provide such a cover which narrowly limits the amount of resilient movement that can be imparted to the retention means during its attachment to the wheel or removal therefrom and which thereby prevents bending of the retention device beyonds its elastic limit.

Another object is to provide an improved retention device comprising a sharp barb adapted to embed into an axial flange of the wheel to effect the retention and which thus has the retention effectiveness of conventional devices, but which comprises cam means for disengaging the attachment between the barb and wheel flange when forced axially beyond a predetermined limit toward the wheel, thereby to achieve coaxial alignment between the cover and wheel by assuring that each of the circumferentially spaced retention devices when attached to the wheel lies in substantially the same plane normal to the wheel axis.

Other and more specific objects are to provide a retention means comprising a formed ribbon of spring steel secured to the wheel cover and having a wheel engaging barb on a resiliently hinged arm adapted to urge the barb radially outward with spring force into biting engagement with the axial wheel flange. The axial arm extends outward beyond the barb from a spring hinge connection with a fixed portion secured to the wheel cover and is provided with a locating arm that extends radially outward to engage a radial flange of the wheel when the cover is forced axially toward the wheel beyond a predetermined limit.

In a typical wheel construction, the aforesaid radial wheel flange merges arcuately with the axial wheel flange, which the barb engages, to provide a rounded cam surface. The locating arm of the retention device is dimensioned to engage a radially outer portion of the cam surface when the cover is at said predetermined limit and to slide by cam action radially inward along the cam surface when the wheel cover is forced axially toward the wheel beyond said limit. In consequence, the axial barb carrying arm is resiliently forced radially inward to detach the barb from its biting engagement with the axial wheel flange, releasing the cover to enable its axial outward movement until reverse movement of the locating arm radially outward along the cam enables the barb to re-engage and bite into the wheel flange.

During attachment of the wheel cover to the wheel, the barb frictionally engages the axial wheel flange and tends to resist the axial inward movement of the cover to the attached position. Thus, the axial barb carrying arm tends to drag behind the wheel cover as it moves to the position whereat attachment is desired. It is accordingly another specific object of the invention to provide a backup projection of the wheel cover closely spaced axially outward from the locating arm to limit the extent to which the latter and the barb carrying arm secured thereto can lag behind axial inward movement of the wheel cover.

By reason of the radial outward spring force of the axial barb carrying retention arm that urges the barb into engagement with the wheel flange when attached thereto, the axial barb carrying arm in its unstressed condition would extend obliquely to the axis of the wheel and cover, such that without some provision to the contrary, the locating arm would in some instances engage peripheral portions of the wheel and interfere with attachment of the cover. Another object, therefore, it to provide an axial extension of the barb carrying arm that lies radially inward of the back-up projection to limit radially outward movement of the latter axial extension and barb carrying arm.

Other objects of this invention will appear in the following description and appended claims, reference being had to the accompanying drawings forming a part of this specification wherein like reference characters designate corresponding parts in the several views.

Figure 1:
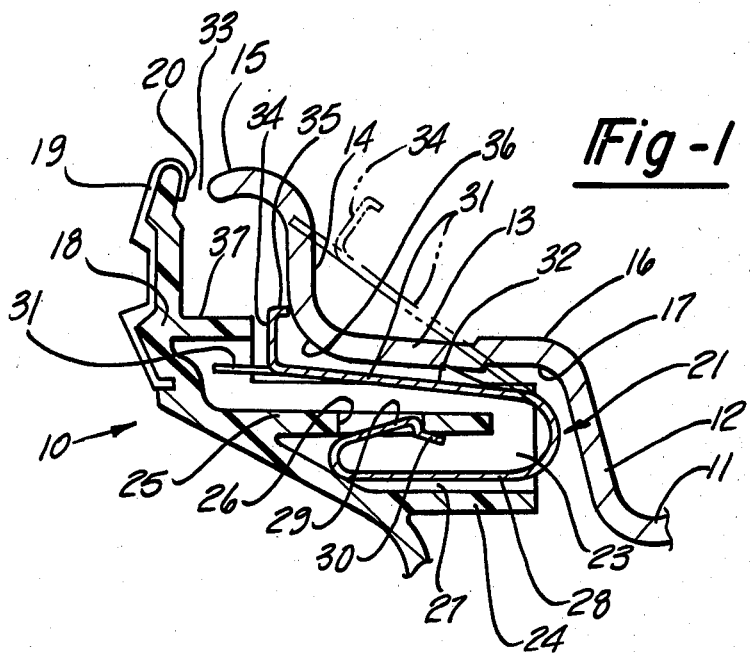
FIG. 1 is a fragmentary sectional view in a plane along the principal axis of a wheel cover, illustrating a retention device embodying the invention.
Figure 2:
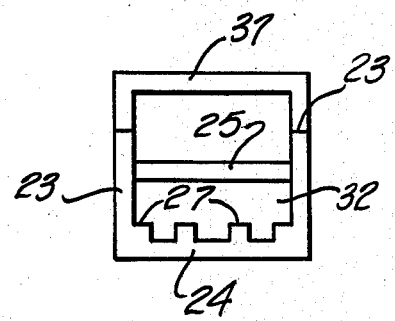
FIG. 2 is a view taken in the direction of the arrows substantially along the line 2—2 of FIG. 1, with the spring retention clips removed.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENTS

Referring to the drawings, an embodiment of the present invention is illustrated by way of example with a wheel cover 10, although the invention is useful with an ornamental trim ring, or other wheel trims. The cover 10 may be conventional except for the retention means described in detail below. As is customary, six or eight such retention means for securing the cover to a vehicle wheel may be provided at a plurality of uniformly and circumferentially spaced locations. The retention device described herein may be used at six or eight locations as is conventional if desired, but because of its superior effectiveness may also be used at only one half as many uniformly spaced locations, and may be alternated with retainers that are primarily effective to assist in locating the wheel cover properly on the wheel and which may be removed from the wheel far more readily than the barb type retention device.

A fragmentary peripheral portion of a typical automobile wheel comprises a rim channel 11 that underlies a vehicle tire and has an outer radial side wall 12 that extends outwardly to an axial rim flange 13. The axially outer edge of flange 13 merges with a radial flange 14 that extends outward and terminates in a radially and axially outwardly rounded portion 15 to which wheel balancing weights are frequently secured. The axially inner edge of flange 13 comprises a radially outward annular safety hump 16 which provides a radially opposite inwardly opening annular channel 17.

The retention means illustrated is associated with a wheel cover 10 comprising a hard molded annular plastic body 18 having a peripheral portion covered by a thin metal ornamental trim member 19 secured thereto, as for example by inbent flanges 20.

A retention clip 21 formed from a ribbon of spring steel has a fixed portion confined within one of each of a plurality of uniformly circumferentially spaced axially inward opening recesses 22, each being defined by a pair of circumferentially spaced side walls 23, an axial annular base flange 24, and an outer wall 25 spaced radially outward from the flange 24 and spanning the side walls 23. The walls and flanges 23, 24 and 25 are formed integrally with the molded plastic body 18. An opening 26 is formed centrally in the outer wall 25. A plurality of axially extending reinforcing ribs or runners 27 project radially outwardly from the flange 24 to provide a platform opposite wall 25 for a generally axially extending fixed portion 28 of the retention clip 21. Preferably, the radial dimension of the supporting surface of the platform ribs 27 is carefully controlled to provide reference from which the other radial dimensions of the cover 10 are measured.

The axially outer end of the fixed portion 28 curves radially outwardly and axially inwardly in a hairpin loop seated against the body 18 within its recess 22 and thereafter extends at 29 into the opening 26 and terminates in a radially inwardly offset portion 30 confined under resilient tension against the inner surface of the wall 25 adjacent the axially inner edge of the opening 26, thereby to urge the clip 21 axially into the recess 22 and also to urge the fixed portion 28 radially inwardly against the platform ribs 27.

Figure 3:
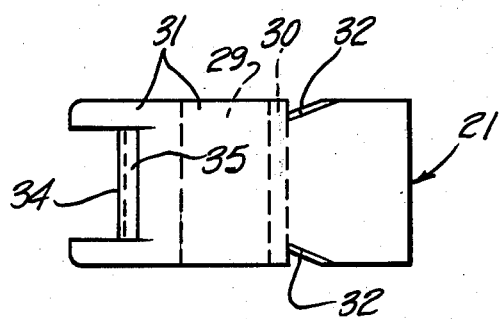
FIG. 3 is a plan view of the spring clip of FIG. 1, removed from the wheel cover.

The axially outer end of the fixed portion 28 curves radially and axially outwardly in a reverse hairpin loop or spring hinge to provide a radially outer and generally axially extending retention arm 31. A pair of circumferentially spaced barbs 32 integral with arm 31 are resiliently urged thereby against the flange 13 to embed thereinto at a location axially outward of the channel 17 when the cover 10 is secured properly to the wheel flange 13. As illustrated in FIG. 3, the barbs 32 may be conventional upturned circumferentially spaced edge portions of the resilient retention arm 31 which extends axially outward beyond the barbs 32.

The barbed retention clip 21 is very effective in attaching a wheel cover to a wheel flange such as the axially extending flange 13. Accordingly, if the wheel cover 10 is carefully secured coaxially to the flange 13 in proper axially spaced relationship, as few as three uniformly spaced barbed retention devices of the type described are adequate to secure the cover 10 positively to the wheel.

It is frequently difficult to remove the conventional wheel cover when retained by conventional retention barbs of the type shown. Typically a wheel cover is removed by inserting the blade of a screwdriver into the annular space 33 between flanges 15 and 20 and swinging the handle of the screwdriver toward the tire to pry the cover axially outwardly. When the retention barbs of conventional wheel covers are securely embedded within the flange 13, the associated resilient retention clip frequently merely yields, as for example at a hairpin loop or spring hinge connected with the barbed retention arm. When the prying force is released, the spring clip may return to its initial condition and the barbs will not be dislodged from their attachment to the flange 13. In addition, in some situations the conventional spring clips are deformed beyond their elastic limits during the prying operation. Thereafter they become useless for securing the cover to the wheel.

A concept of the invention has thus been to improve the removability of the barb type retention clip, without impairing its attachment effectiveness, and also to provide means for accurately securing such clips to the wheel as described at predetermined axial locations, so that coaxial alignment of the cover 10 on the wheel is assured and approximately only half as many retention clips 21 are required for the attachment as heretofore.

By properly locating the wheel cover 10 coaxially with the wheel, not only are half as many barb type retainers 21 necessary, but excessive tire wear is reduced and driving qualities of the vehicle are improved.

The desired coaxial alignment between the cover 10 and wheel flange 13 is achieved and maintained by extending the walls 23 radially outwardly beyond the wall 25 so as to terminate as closely as feasible to the flange 13 when the cover 10 is properly attached. Sufficient clearance between the outer ends of the walls 23 and flange 13 must be maintained to prevent interference therebetween in the event of an unusual stack-up of tolerances in the dimensions of the cover 10 and wheel, as for example approximately 0.030 inches clearance for a fifteen inch wheel. In consequence, the maximum eccentricity of the cover 10 for such a wheel would be approximately 0.030 inches, and damage to the spring clip 21 or its breakage as a result of improper alignment is completely eliminated. Furthermore, by virtue of the radial spacing between the walls 23 and the wheel flange 13, wearing of the walls 23 that would impair their usefulness is nominal.

The walls 23 in close proximity to the flange 13 also facilitate removal of the wheel cover 10 when desired. When the blade of a screwdriver is inserted into the clearance 33 and pried axially outward against the adjacent portion of the wheel cover 10, the latter will move radially outwardly and cock the cover 10 out of coaxial alignment. The diametrically opposite walls 23 will thus be moved radially inwardly into engagement with the adjacent portions of the flange 13 and serve as a fulcrum about which the wheel cover 10 may be swung in a removal operation. By successively changing the circumferential location of the prying operation, the cover 10 may be readily eased axially outwardly and removed from the wheel without at any time subjecting the cover 10 or retention clip 21 to undue bending forces.

Except for the provision of the walls 23 as described, careless or accidental assembly of the cover 10 eccentrically with respect to the wheel flange 15 could force the arm 31 excessively inwardly toward the outer wall 25. Likewise, without the protection afforded by the structure described below, the frictional engagement between the barbs 32 and flange 13 could drag the arm 31 axially outward with respect to the fixed clip portion 28 as the wheel cover 10 is moved axially toward the wheel during the assembly operation. In consequence of such bending of the arm 31 and its spring hinge connection with the fixed portions 28 that occurs with conventional constructions, the latter hinge connection is often stressed sufficiently to be permanently deformed and in fact to cause breakage of the spring steel at the region of the axially inner hairpin loop.

The above noted objections are avoided by extending the retention arm 31 axially outward beyond the barbs 32 and by providing a radially outwardly extending arm 34 integral with the arm 31. The radially outer end of the arm 34 comprises an axially inwardly projecting tip 35 adapted to engage the rounded connection 36 between the flanges 13 and 14 when the cover 10 is at its desired coaxial position of attachment with the wheel. An attempt to force the cover 10 axially toward the wheel beyond the desired position illustrated will cause the tip 35 to ride radially inward along the aforesaid rounded flange connection 36 against the spring force of the retention arm 31 and cause the barbs 32 to be withdrawn from biting engagement with the flange 13. Thereafter when the force urging the wheel cover 10 excessively toward the wheel is removed to enable axial outward movement of the cover 10, the tip 35 will then ride radially outwardly along the rounded flange connection 36 and return to the desired attachment position whereat the barbs 32 will again embed into the flange 13. Thus in addition to maintaining the cover in coaxial alignment, the structure described provides means for maintaining the cover 10 in a desired axial relationship with respect to the wheel flange 13.

Further in the above regard, a plastic back-up flange 37 of the molded body 18 extends axially inward to adjacent the radial location arm 34 so as to comprise a movement limiting stop to limit axial outward movement of the locating arm 34 and thus of the retention arm 31 and the barbs 32 with respect to the cover 10 during attachment of the latter to the wheel, and also to limit radial upward movement of the spring arm 31. Without the stop or flange 37, prior to assembly of the cover 10 with the wheel, the radially outer end of arm 31 would move to its unstressed condition illustrated in phantom and might engage the wheel flange 16 and interfere with attachment of the cover 10.

In order to assemble the cover 10 to the wheel flange 13, the cover 10 is aligned coaxially with the wheel and moved axially toward the latter. The barbs 32 or an adjacent portion of arm 31, depending upon the dimensions of the parts, will first engage the rounded cam surace 36 and resiliently depress the arm 31 radially inward against its radially outward spring bias. Thereafter the barbs 32 will engage and ride along flange 13. Usually the friction between the barbs 32 and flange 13 will resist the axial inward movement, apply an axial stress to the arm 31, and resiliently force the locator arm 34 against the back-up stop 37. Thereafter the barbs 32 will be forced axially inward with continued inward movement of the cover 10 until the latter abuts or nearly abuts the flange 15. In the meanwhile, tip 35 will have engaged cam surface 36 and caused the barbs 32 to be retracted radially inwardly from engagement with flange 13. When the axially inward assembly force applied to cover 10 is released, the axially tensed spring hinge connecting the clip portion 28 with the retention arm 31 will force the cover 10 axially outward to relieve the tension in the spring hinge and establish the essentially unstressed clearance illustrated between the locator arm 34 and stop 37. In the same action, the radial spring bias of arm 31 will move the locator tip 35 outward along the cam surface 36 until the barbs 32 engage and embed into the flange 13. By virtue of a similar action at all of the several circumferentially spaced retention clips 21, the wheel cover 10 will be attached coaxially to the wheel flange 13 in predetermined axially spaced relationship, all without subjecting the clips 21 to excessive bending or deformation.

Among the characteristics of the structure described is that as the cover 10 is moved axially toward the wheel for attachment thereto, the frictional drag on retention arm 31 caused by engagement of the barbs 32 with wheel flange 13 applies an axial tension to the arm 31, which in turn tenses the spring hinge or U-loop connecting the fixed portion 28 and arm 31 and reduces the radial spacing between the latter two elements. Accordingly, while the spring hinge is under such tension, tip 35 will engage flange 14 at a slightly lower position along the curvature 36 than when that tension is released. Ordinarily, as the mechanic attaches the wheel cover 10, he will tap it sucessively in an axial direction at various circumferential locations to complete the attachment. If any residual axial tension as described immediately above exists in arm 31 and the spring hinge, the barbs 23 will be jarred loose to snap axially inward and essentially release that tension. In fact the axial force of the mechanic's tap might even cause the flange 37 to strike arm 34 and jar the barbs 32 loose from flange 13. The barbs 23 will then engage flange 13 properly at the desired locations and the tip 35 will engage flange 14 as illustrated at or slightly above the upper portion of the curvature 36.

I claim:

1. A wheel cover adapted for attachment to an annular axial flange of a vehicle wheel wherein the axially outer portion of said axial wheel flange is connected by an arcuate cam portion with a generally radially directed wheel flange, said cover having a plurality of circumferentially spaced spring clips, each clip comprising a retention arm having a generally axially extending portion resiliently yieldable radially for enabling coaxial movement of said cover toward said wheel and for engaging said wheel flange with radially directed spring force to effect said attachment, each clip comprising a fixed portion secured to said cover and an axially outwardly opening loop resiliently connecting said fixed and axially extending portions for resiliently urging said axially extending portion into said engagement with said axial flange when said cover is moved coaxially toward said wheel, and means to facilitate coaxial alignment of said cover and wheel in predetermined axially spaced relationship comprising locating means of said retention arm for engaging said wheel and camming said axially extending portion radially in the direction opposing said spring force to prevent said attachment when said retention arm is moved axially toward said wheel beyond a predetermined limit, said locating means comprising an axially outer portion of said axially extending portion adapted to engage said cam portion, a locating arm secured to said retention arm for moving therewith and extending radially from said axially outer portion of said retention arm when said cover is attached to said wheel, said cover having movement limiting means projecting axially inward toward said locating arm and terminating at a location adjacent to and spaced axially outwardly therefrom to limit resilient yielding of said loop and axially outward movement of said locating arm and attached retention arm.

2. The combination according to claim 1, said movement limiting means also having a portion adjacent to and spaced radially from said retention arm to limit radial movement of the latter in the direction of said spring force.

3. The combination according to claim 1, said fixed and axially extending portions comprising radially spaced arms and said axially outwardly opening loop being dimensioned to be compressed resiliently to a generally U-shape to effect said radially directed force when said cover is attached to said wheel, said retention arm having an intermediate portion engageable with said flange for effecting said attachment and also having an axially outer portion comprising said locating means for engaging said wheel and camming said retention arm and intermediate portions from said attachment when said cover is moved axially toward said wheel beyond said predetermined limit.

4. The combination according to claim 3, said intermediate portion of said retention arm comprising a sharp barb adapted to be embedded radially into said wheel flange by said force to effect said attachment, and means for limiting axial outward yielding of said loop comprising said movement limiting means of said cover cooperable with said retention arm to limti axial outward movement thereof.

5. The combination according to claim 4, and movement limiting means of said cover cooperable with said retention arm to limit radial movement thereof in the direction of said spring force.

6. The combination according to claim 1, said means to facilitate said coaxial alignment of said cover also comprising portions of said cover associated with each retention arm respectively for limiting the radial bending of each retention arm to a predetermined nominal extent in the direction opposing said resilient force, each of the last named portions extending radially in the direction of said force for confronting said axial wheel flange in closely spaced relationship at a location adjacent the associated retention arm when the cover is attached coaxially to said wheel.

* * * * *